US008060437B2

(12) United States Patent
Foster

(10) Patent No.: US 8,060,437 B2
(45) Date of Patent: Nov. 15, 2011

(54) AUTOMATIC TERMINATION OF ELECTRONIC TRANSACTIONS

(75) Inventor: Chuck Foster, Yountville, CA (US)

(73) Assignee: International Funding Partners LLC, Las Vegas, NV (US)

(*) Notice: Subject to any disclaimer, the term of this patent is extended or adjusted under 35 U.S.C. 154(b) by 115 days.

(21) Appl. No.: 11/554,880

(22) Filed: Oct. 31, 2006

(65) Prior Publication Data

US 2008/0103965 A1    May 1, 2008

(51) Int. Cl.
*G06Q 40/00* (2006.01)
(52) U.S. Cl. ............... 705/38; 705/35; 705/39; 705/26; 705/27; 705/71
(58) Field of Classification Search .................. 705/39, 705/26, 38, 35, 27, 71
See application file for complete search history.

(56) References Cited

U.S. PATENT DOCUMENTS

| | | |
|---|---|---|
| 5,465,206 A | 11/1995 | Hilt et al. |
| 5,602,918 A | 2/1997 | Chen et al. |
| 5,621,797 A | 4/1997 | Rosen |
| 5,644,724 A | 7/1997 | Cretzler |
| 5,650,768 A | 7/1997 | Eswaran |
| 5,671,279 A | 9/1997 | Elgamal |
| 5,671,280 A | 9/1997 | Rosen |
| 5,704,046 A | 12/1997 | Hogan |
| 5,715,399 A | 2/1998 | Bezos |
| 5,727,163 A | 3/1998 | Bezos |
| 5,732,400 A | 3/1998 | Mandler et al. |
| 5,745,886 A | 4/1998 | Rosen |
| 5,757,917 A | 5/1998 | Rose et al. |
| 5,758,327 A | 5/1998 | Gardner et al. |
| 5,787,403 A | 7/1998 | Randle |
| 5,790,677 A | 8/1998 | Fox et al. |
| 5,822,737 A | 10/1998 | Ogram |
| 5,826,241 A | 10/1998 | Stein et al. |
| 5,839,119 A | 11/1998 | Krsul et al. |
| 5,870,723 A | 2/1999 | Pare, Jr. et al. |
| 5,878,139 A | 3/1999 | Rosen |
| 5,878,141 A | 3/1999 | Daly et al. |
| 5,883,810 A | 3/1999 | Franklin et al. |
| 5,886,634 A | 3/1999 | Muhme |
| 5,890,137 A | 3/1999 | Koreeda |
| 5,897,621 A | 4/1999 | Boesch et al. |
| 5,904,046 A | 5/1999 | Kawano |
| 5,940,811 A | 8/1999 | Norris |
| 5,949,044 A | 9/1999 | Walker et al. |
| 5,952,638 A | 9/1999 | Demers et al. |
| 5,956,699 A | 9/1999 | Wong et al. |
| 5,960,411 A | 9/1999 | Hartman et al. |
| 5,963,134 A | 10/1999 | Bowers et al. |

(Continued)

FOREIGN PATENT DOCUMENTS

EP    0372716    6/1990

(Continued)

OTHER PUBLICATIONS

"Wholesale Account Application" at http://www.allstates-flag.com/forms/wholesale_app.pdf; AllStates Flag Co., Inc.; Missouri Corporation.

(Continued)

*Primary Examiner* — Samica L Norman

(57) ABSTRACT

A system and method of terminating a transaction between a merchant and customer are disclosed.

36 Claims, 6 Drawing Sheets

U.S. PATENT DOCUMENTS

| | | | | |
|---|---|---|---|---|
| 5,970,475 | A | 10/1999 | Barnes et al. | |
| 5,987,140 | A | 11/1999 | Rowney et al. | |
| 5,991,750 | A | 11/1999 | Watson | |
| 5,996,076 | A | 11/1999 | Rowney et al. | |
| 5,999,596 | A | 12/1999 | Walker et al. | |
| 6,000,832 | A | 12/1999 | Franklin et al. | |
| 6,002,767 | A | 12/1999 | Kramer | |
| 6,016,504 | A | 1/2000 | Arnold et al. | |
| 6,049,785 | A | 4/2000 | Gifford | |
| 6,149,055 | A | 11/2000 | Gatto | |
| 6,169,974 | B1 | 1/2001 | Baumgartner et al. | |
| 6,175,922 | B1 | 1/2001 | Wang | |
| 6,182,052 | B1 | 1/2001 | Fulton et al. | |
| 6,182,894 | B1 | 2/2001 | Hackett et al. | |
| 6,232,877 | B1 | 5/2001 | Ashwin | |
| 6,267,292 | B1 | 7/2001 | Walker et al. | |
| 6,292,786 | B1 | 9/2001 | Deaton et al. | |
| 6,321,339 | B1 | 11/2001 | French et al. | |
| 6,332,134 | B1 | 12/2001 | Foster | |
| 6,343,279 | B1 | 1/2002 | Bissonette et al. | |
| 6,477,513 | B1 | 11/2002 | Walker et al. | |
| 6,577,238 | B1 | 6/2003 | Whitesmith et al. | |
| 6,587,835 | B1 | 7/2003 | Treyz et al. | |
| 6,658,393 | B1 | 12/2003 | Basch et al. | |
| 6,675,153 | B1 | 1/2004 | Cook et al. | |
| 6,807,530 | B1 | 10/2004 | Shub et al. | |
| 6,812,824 | B1 | 11/2004 | Goldinger et al. | |
| 6,868,393 | B1 * | 3/2005 | Demsky et al. | 705/26 |
| 6,883,710 | B2 | 4/2005 | Chung | |
| 6,996,535 | B1 | 2/2006 | Ono et al. | |
| 7,035,816 | B2 | 4/2006 | Jankelewitz | |
| 7,065,494 | B1 | 6/2006 | Evans | |
| 7,082,412 | B1 | 7/2006 | Treider et al. | |
| 7,104,443 | B1 | 9/2006 | Paul et al. | |
| 7,104,446 | B2 | 9/2006 | Bortolin et al. | |
| 7,146,342 | B1 | 12/2006 | Angelin et al. | |
| 7,194,437 | B1 | 3/2007 | Britto et al. | |
| 7,302,429 | B1 | 11/2007 | Wanker | |
| 7,320,001 | B1 | 1/2008 | Chen | |
| 7,330,846 | B1 | 2/2008 | Dirisala et al. | |
| 7,333,056 | B2 | 2/2008 | Kishigami et al. | |
| 7,333,953 | B1 | 2/2008 | Banaugh et al. | |
| 7,343,322 | B1 * | 3/2008 | Mulderry et al. | 705/26 |
| 7,383,215 | B1 | 6/2008 | Navarro et al. | |
| 7,386,476 | B1 | 6/2008 | Shavanadan et al. | |
| 7,509,289 | B2 | 3/2009 | Barron et al. | |
| 7,630,919 | B1 | 12/2009 | Obrecht | |
| 2001/0007979 | A1 | 7/2001 | Teshima | |
| 2001/0051917 | A1 * | 12/2001 | Bissonette et al. | 705/39 |
| 2002/0007323 | A1 | 1/2002 | Tamatsu | |
| 2002/0065680 | A1 | 5/2002 | Kojima et al. | |
| 2002/0065736 | A1 | 5/2002 | Willner et al. | |
| 2002/0087471 | A1 | 7/2002 | Ganesan et al. | |
| 2002/0107723 | A1 | 8/2002 | Benjamin et al. | |
| 2002/0111907 | A1 | 8/2002 | Ling | |
| 2002/0116318 | A1 | 8/2002 | Thomas | |
| 2002/0120559 | A1 | 8/2002 | O'Mara et al. | |
| 2002/0133470 | A1 | 9/2002 | Gruber | |
| 2002/0153418 | A1 | 10/2002 | Maloney | |
| 2002/0174030 | A1 | 11/2002 | Praisner et al. | |
| 2003/0097270 | A1 | 5/2003 | Musselwhite et al. | |
| 2003/0097330 | A1 | 5/2003 | Hillmer et al. | |
| 2003/0105711 | A1 * | 6/2003 | O'Neil | 705/39 |
| 2003/0120600 | A1 | 6/2003 | Gurevich | |
| 2003/0151493 | A1 | 8/2003 | Straumann et al. | |
| 2003/0195753 | A1 | 10/2003 | Homuth | |
| 2003/0212629 | A1 | 11/2003 | King | |
| 2003/0220858 | A1 | 11/2003 | Lam et al. | |
| 2004/0019531 | A1 | 1/2004 | Broussard et al. | |
| 2004/0049451 | A1 | 3/2004 | Berardi et al. | |
| 2004/0083165 | A1 | 4/2004 | Lawrence | |
| 2004/0088238 | A1 | 5/2004 | Gilson et al. | |
| 2004/0143505 | A1 | 7/2004 | Kovach | |
| 2004/0143527 | A1 | 7/2004 | Benkert et al. | |
| 2004/0169675 | A1 | 9/2004 | Beck et al. | |
| 2004/0210531 | A1 | 10/2004 | Barron et al. | |
| 2004/0254829 | A1 | 12/2004 | Tripp | |
| 2004/0254835 | A1 | 12/2004 | Thomas et al. | |
| 2005/0040230 | A1 | 2/2005 | Swartz et al. | |
| 2005/0080719 | A1 | 4/2005 | Sellen et al. | |
| 2005/0144130 | A1 | 6/2005 | Staniar et al. | |
| 2005/0278251 | A1 | 12/2005 | Hahn-Carlson | |
| 2005/0283434 | A1 | 12/2005 | Hahn-Carlson et al. | |
| 2006/0010074 | A1 | 1/2006 | Zeitsiff et al. | |
| 2006/0191995 | A1 | 8/2006 | Stewart et al. | |
| 2006/0195382 | A1 | 8/2006 | Sung | |
| 2006/0218006 | A1 | 9/2006 | Malik et al. | |
| 2006/0218058 | A1 | 9/2006 | Wojcik et al. | |
| 2006/0224464 | A1 * | 10/2006 | Walker et al. | 705/26 |
| 2007/0078760 | A1 * | 4/2007 | Conaty et al. | 705/39 |
| 2007/0174249 | A1 | 7/2007 | James | |
| 2007/0192218 | A1 | 8/2007 | Licardi et al. | |
| 2008/0091546 | A1 * | 4/2008 | Kirovski et al. | 705/26 |
| 2008/0103966 | A1 | 5/2008 | Foster | |
| 2008/0114684 | A1 | 5/2008 | Foster | |
| 2008/0114691 | A1 | 5/2008 | Foster | |
| 2008/0140577 | A1 * | 6/2008 | Rahman et al. | 705/71 |
| 2008/0195528 | A1 | 8/2008 | Keithley | |

FOREIGN PATENT DOCUMENTS

| | | |
|---|---|---|
| EP | 1244043 | 9/2002 |
| EP | 1533767 | 5/2005 |
| EP | 1713037 | 10/2006 |
| GB | 2387744 | 10/2003 |
| JP | 2003085352 | 3/2003 |
| WO | 9945498 | 9/1999 |
| WO | 0219211 | 3/2002 |
| WO | 0245029 | 6/2002 |
| WO | 2006076168 | 7/2006 |
| WO | 2006125296 | 11/2006 |
| WO | 2008086531 | 7/2008 |

OTHER PUBLICATIONS

International Search Report of Mar. 22, 2001 in PCT/US00/30532, 1 page.

Official Action of Jul. 7, 2004 in U.S. Appl. No. 09/703,473, 8 pages.

Response to Official Action of Jul. 7, 2004 in U.S. Appl. No. 09/703,473, mailed on Dec. 29, 2006, 20 pages.

Official Action of Aug. 30, 2007 in U.S. Appl. No. 09/703,473, 17 pages.

Response to Official Action of Aug. 30, 2007 in U.S. Appl. No. 09/703,473, mailed on Feb. 26, 2008, 13 pages.

Official Action of May 20, 2008 in U.S. Appl. No. 09/703,473, 27 pages.

Response to Official Action of May 20, 2008 in U.S. Appl. No. 09/703,473, mailed Jul. 21, 2008, 11 pages.

Official Action of Jul. 31, 2008 in U.S. Appl. No. 09/703,473, 3 pages.

Official Action of Sep. 19, 2008 in U.S. Appl. No. 09/703,473, 13 pages.

Official Action of Aug. 25, 2008 in U.S. Appl. No. 11/554,854, 32 pages.

Official Action of Aug. 6, 2008 in U.S. Appl. No. 11/554,865, 45 pages.

International Search Report and Written Opinion for Application No. PCT/US07/83186, mailed Sep. 2, 2008.

International Search Report and Written Opinion for Application No. PCT/US07/83189, mailed Sep. 25, 2008.

Application and drawings for U.S. Appl. No. 09/703,473, filed Oct. 31, 2000, 53 pages.

Low, et al., "Anonymous Credit Cards", Association of Computing Machinery, pp. 108-117, (1994).

Gifford et al., "Payment Switches for Open Networks", USENIX Workshop on Electronic Commerce, pp. 1-9 (Jul. 1995).

Bellare et al., "iKP—A Family of Secure Electronic Payment Protocols, Extended Abstract", http//:www.zurich.ibm.com/Technology/Security/extern/ecommerce/, 3 pages (Aug. 2, 1995).

Udo Flohr, "Electric Money", BYTE Magazine, www.byte.com/art/9705/sec17/art.html, pp. 74-84 (Jun. 1996).

Mark Carroll, "Internet-Commerce Security", BYTE Magazine, pp. 1-5 (May 1997).

Response to Official Action of Aug. 25, 2008 in U.S. Appl. No. 11/554,854, 16 pages filed Nov. 21, 2008.

Response to Official Action of Sep. 19, 2008 in U.S. Appl. No. 09/703,473, 14 pages filed Dec. 19, 2008.
Response to Official Action of Aug. 6, 2008 in U.S. Appl. No. 11/554,865, 18 pages filed Nov. 6, 2008.
International Search Report for Application No. PCT/US01/26718 dated Jan. 10, 2002, 1 page.
European Search Report for Application No. 04027853 dated Feb. 24, 2005, 3 pages.
International Search Report for Application No. PCT/CA2006/000516 dated Jun. 22, 2006, 4 pages.

* cited by examiner

| | | |
|---|---|---|
| Merchant I.D. | 123456789 | ~1202 |
| Invoice Number | 6577 | ~1204 |
| Purchase Amount | 577.98 | ~1206 |
| Transaction Date | 6/14/1999 | ~1208 |
| Merchant OVTR | acme@merchant.com | ~1210 |

| | | |
|---|---|---|
| Cardholder I.D. | 987654321 | ~1222 |
| Cardholder OVTR | buyer@customer.com | ~1224 |
| Merchant I.D. | 123456789 | ~1202 |
| Invoice Number | 6577 | ~1204 |
| Purchase Amount | 577.98 | ~1206 |
| Transaction Date | 6/14/1999 | ~1208 |
| Merchant OVTR | acme@merchant.com | ~1210 |

| | | |
|---|---|---|
| Invoice Number | 6577 | ~1204 |
| Purchase Amount | 577.98 | ~1206 |
| Transaction Date | 6/14/1999 | ~1208 |
| Shipping Name | John Smith | ~1232 |
| Shipping Address | 345 Silver Ave | ~1234 |
| Shipping City | Fosterville | ~1236 |
| Shipping State | CA | ~1238 |
| Shipping Zip | 94999 | ~1240 |

| | | |
|---|---|---|
| Invoice Number | 6577 | ~1204 |
| Purchase Amount | 577.98 | ~1206 |
| Transaction Date | 6/14/1999 | ~1208 |
| Shipping Name | | |
| Shipping Address | | |
| Shipping City | } 1243 | |
| Shipping State | | |
| Shipping Zip | | |
| Shipper | UPS | ~1241 |

Purchase Log

*1300*

| Date<br>1302 | Company Name<br>1304 | Total<br>1306 | URL<br>1308 | e Mail<br>1310 | Transaction #<br>1312 |
|---|---|---|---|---|---|
| 1/11/1998 | Travel Source | $2151.95 | http://www.go-travel.com | reservations@go-travel.com | 3488 366 1/11/98 |
| 9/29/1998 | Satillite Photos | $545.00 | http://www.sky_pix.com | sales@sky_pix.com | 3516 345 9/29/98 |
| 1/10/1998 | Barns & Hope | $403.47 | http://www.barns.hope.com | clothes@barns.hope.com | 3543 362 1/10/98 |
| 10/27/1998 | Book Swamp | $142.90 | http://www.swamp.com | order@swamp.com | 3551 354 10/27/98 |
| 7/23/1998 | D V Vinyards | $234.85 | http://www.chardonnay.com | wine@chardonnay.com | 3564 381 7/23/98 |
| 7/6/1998 | Roofing Co. Inc. | $599.50 | http://www.roofing.com | sales@roofing.com | 3585 379 7/6/98 |

[ Find Report ]   [ Find All ]

ELECTRONIC SHOPPING CART

Merchant Name: Acme Inc. **
Merchant CardFort ID: 123456789 ** } 1402
Merchant Telephone: (800)555-5555 **

| 1/10/1999 | ABC112 |
| Order Date | Order Number |

| QUANTITY | ITEM NO. | DESCRIPTION | PRICE/UNIT | AMOUNT |
|---|---|---|---|---|
| 1 | 454-Md | Ladies Safari-Tan | $94.00 | $94.00 |
| 2 | 586-Md | Ladies Polo-Blu | $38.00 | $76.00 |
| 2 | 658-Md | Ladies Puller-Blu | $68.49 | $136.98 |
| 1 | 587-Md | Ladies Collar-Wht | $68.49 | $68.49 |

1404 brackets the item rows above.

Subtotal $375.47
Tax $0.00
Shipping $28.00
TOTAL $403.47
} 1406

1408
[BUY]

** Denotes information entered by cardholder from paper catalog

FIG.7

AUTOMATIC TERMINATION OF ELECTRONIC TRANSACTIONS

BACKGROUND

1. Field

The subject matter disclosed herein related to processing transactions between a seller and a customer.

2. Information

Technological advances in financial services have enabled efficient non-cash transactions between merchants and customers. The evolution of credit cards and debit cards have enabled efficient payment for goods and/or services without the use of cash. In such non-cash transactions, a merchant typically receives information regarding a credit and/or debit card, which is then used to process payment with a financial institution that issues the credit and/or debit card. Additionally, the use of the Internet to process transactions between merchants and customers increasingly involves transmitting a customer's sensitive financial information over public networks.

Businesses have increasingly turned to the use of Internet transactions for the efficient purchase goods and services. Here, an individual associated with a business, such as an employee, may purchase goods and/or services on behalf of the business using a computing platform to communicate with merchants according to one or more Internet protocols. There is a need for processes to enable businesses to efficiently use such transactions while maintaining control over purchasing according to a policy.

BRIEF DESCRIPTION OF THE FIGURES

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIGS. 5A through 5D are diagrams illustrating information that may be transmitted between parties in a non-cash transaction according to an embodiment;

FIG. 6 is a purchase log of transactions according to an embodiment; and

FIG. 7 is a schematic diagram of an electronic shopping cart viewable in a graphical user interface (GUI) to enable a customer to specify purchase of goods and/or services from a merchant according to an embodiment.

DETAILED DESCRIPTION

Figure 1:
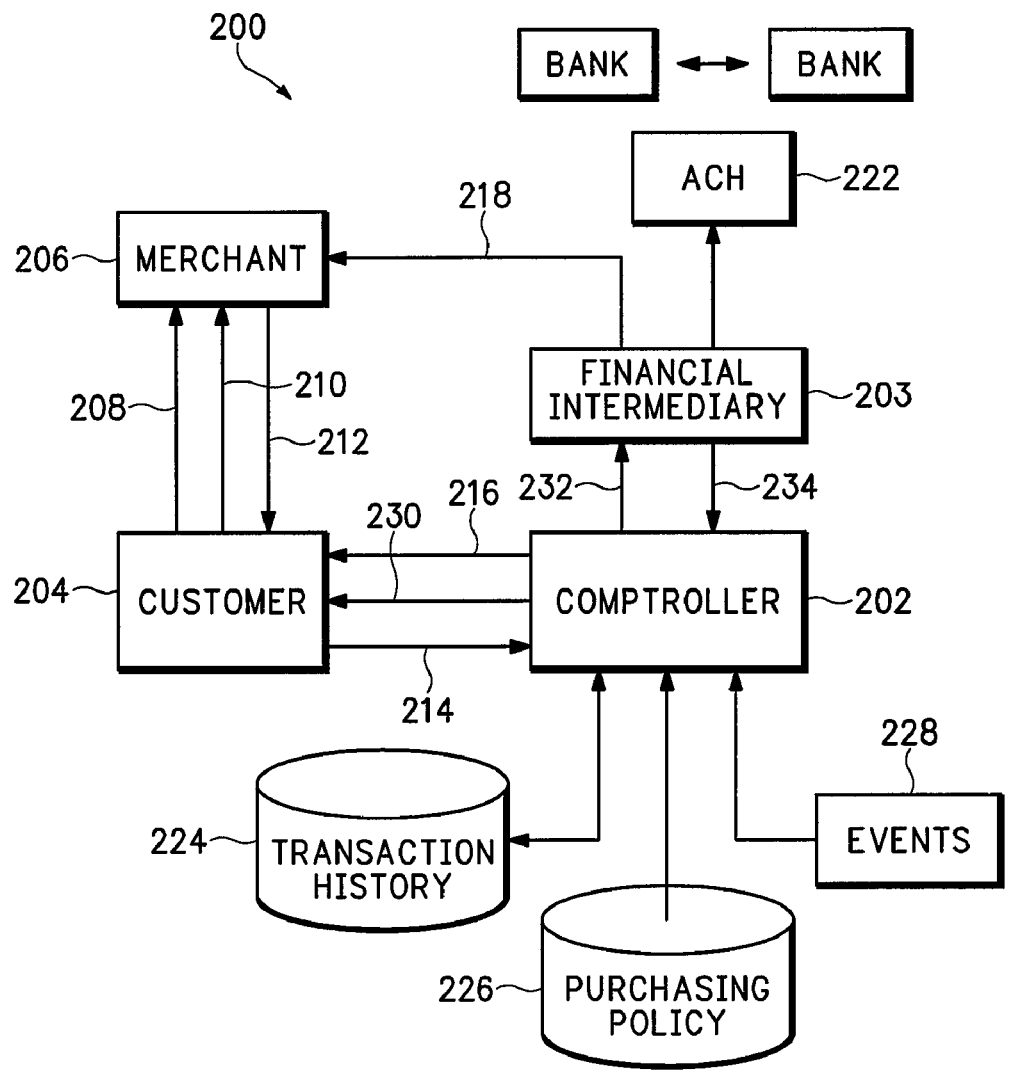
FIG. 1 is a schematic diagram of a financial transaction system according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "loading", "representing," "storing," "associating," "determining", "transmitting," "receiving" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Such actions and/or processes may be executed by a computing platform under the control of machine-readable instructions stored in a storage medium. Further, unless specifically stated otherwise, processes described herein, with reference to flow diagrams or otherwise, may also be executed and/or controlled, in whole or in part, by such a computing platform.

A "seller" as referred to herein relates to a party and/or entity that engages in transactions to provide goods and/or services in exchange for payment. In one embodiment, a seller may comprise a "merchant" that regularly engages in providing particular goods and/or services in exchange for payment as an on-going enterprise. Alternatively, a seller may comprise a private party which is willing to provide a good and/or service on a limited basis (e.g., a private party). However, these are merely examples of a seller and claimed subject matter is not limited in this respect.

A "customer" as referred to herein relates to a party and/or entity that engages in transactions with a seller to receive such goods and/or services in exchange for payment. For example, a seller may provide goods and/or services to one or more customers in exchange for payment from such customers in the form of cash payment, credit, account debit, barter exchange and/or the like. However, this is merely an example of how a seller and customer may engage in transactions for providing goods and/or services in exchange for payment, and claimed subject matter is not limited in these respects.

According to an embodiment, a seller may provide goods and/or services to a customer for non-cash payment. In particular examples, although claimed subject matter is not limited in these respects, such non-cash payment may be financed through credit that the customer has established with a merchant or a financial intermediary using, for example, a credit card. "Credit" refers to an amount of payment a merchant and/or financial intermediary is willing to receive from a customer as a non-cash payment. Such credit may quantify an allowable account balance which the customer promises to pay at a future date. Alternatively, such credit may comprise a cash balance that the customer has established with a merchant and/or a financial intermediary using, for example, a debit card. However, these are merely examples of how a seller and customer may engage in a non-cash transaction for providing goods and/or services, and claimed subject matter is not limited in these respects.

A customer may be associated with a "credit account" comprising information indicative of non-cash payment made on behalf of the customer and/or an ability to make non-cash payments for transactions in the future. For example, such a credit account may be associated with an "account balance" representing a cumulative amount non-cash payment that has been made on behalf of the customer. Here, such an account balance may be maintained by a financial intermediary and/or merchant for payment and reconciliation by the customer in the future. Alternatively, such an account balance may represent a cumulative amount of non-cash payment that may be made on behalf of a customer in the future. Here, such an account balance may represent a cumulative amount of pre-payment and/or credit available for non-cash payment in the future. However, these are merely examples of a credit account and an account balance, and claimed subject matter is not limited in these respects.

According to an embodiment, a seller may provide goods and/or services to a customer as part of a "non-cash transaction" in which the seller does not require payment of cash from the customer as a precondition to tendering the goods and/or services. Such a transaction may be financed by a credit account established on behalf of the customer by, for example, the seller or some financial intermediary. However, this is merely an example of a non-cash transaction and claimed subject matter is not limited in this respect.

In transaction illustrated below, a merchant may comprise any party capable of providing a good and/or service to a customer as part of a credit and/or non-cash transaction. In one particular embodiment, although claimed subject matter is not limited in this respect, a merchant may provide and/or dispense cash to a customer in a transaction that is financed by a financial intermediary. In one example, such a merchant may operate an automatic teller machine (ATM). Here, the good and/or service being purchased by a customer is cash. However, this is merely an example embodiment and claimed subject matter is not limited in this respect.

An entity, such as enterprise, business, family and/or organization for example, may be associated with multiple individuals capable of independently initiating transactions to purchase goods and/or services from merchants on behalf of the entity. Such individuals may comprise, for example, employees, principles, agents and/or the like who are authorized to act as customers to initiate transactions according to a purchasing policy. In some embodiments, such customers may complete such transactions on behalf of such an entity using non-cash payment as illustrated above.

According to an embodiment, although claimed subject matter is not limited in this respect, an entity may authorize individuals to act as customers on behalf of the entity differently based, at least in part, on a purchasing policy. Here, for example, such a policy may authorize an owner and/or high level manager to make any purchase of a good and/or service on behalf of an entity but limit authority of employee non-managers, for example, to purchase of only certain goods and/or services, or purchases from a limited set of merchants. However, this is merely an example of a policy that an entity may employ for controlling the purchasing of goods and/or services on behalf of the entity by multiple individuals and claimed subject matter is not limited in this respect.

Embodiments described herein relate to, among other things, systems and method of processing financial transactions. As illustrated in U.S. Pat. No. 6,332,134 titled "Financial Transaction System," one or more intermediaries may be involved in the processing of a non-cash transaction between a merchant and a customer in such a manner that the merchant does not need access to the customer's sensitive financial information and/or other personal information to complete the transaction. Here, a customer and a merchant may agree on terms of a proposed non-cash transaction to purchase a good and/or service to be financed through, for example, a credit card or debit card transaction. The customer may then forward information regarding the transaction to a financial intermediary (e.g., a credit card company). The financial intermediary may then forward a "payment notification" to the merchant to complete the non-cash transaction. Here, such a payment notification may comprise, among other things, information expressing an intent and/or promise to make payment in exchange for a good and/or service. The merchant may then provide the goods and/or services, and the financial intermediary and the customer may settle accounts following the purchase.

According to a particular embodiment, such a payment notification may comprise information expressing an intent and/or promise to make payment in exchange for a good and/or service to be provided in such a non-cash transaction. In one example, such a payment notification may create a binding agreement between and/or among parties for providing a good and/or service in exchange for payment. In other examples, however, such payment notification need not necessarily create a binding agreement.

According to an embodiment, although claimed subject matter is not limited in these respects, "completion" or "termination" of a financial transaction may occur upon any one of several events associated with such completion or termination of a financial transaction. In one embodiment, completion may occur upon tendering a good and/or service to a customer, payment of funds to a merchant or a confirmation (or promise) to a merchant that payment for a good and/or service is forthcoming. However, these are merely examples of events that may be used to define a completion of a transaction and claimed subject matter is not limited in these respects. In one embodiment, termination of a transaction may occur upon an event and/or condition that prevents completion of a transaction. For example, such a termination of a transaction may occur upon an event and/or condition that prevents payment to a merchant, notice of payment and/or delivery of goods and/or services. However, this is merely an example of a termination of a transaction and claimed subject matter is not limited in this respect.

According to an embodiment, and as illustrated below with specific examples, a customer merchant and/or financial intermediary may be associated with a communication devices and/or computing platforms capable of communicating with one another over a data communication network. In a particular example, although claimed subject matter is not limited in this respect, a customer may participate in non-cash transactions with a merchant by using a personal computer, cell phone, personal digital assistant, two-way pager and/or interactive television that receives user inputs from a remote control. However, these are merely examples devices that may enable a customer to participate in a non-cash transaction according to a particular embodiment and claimed subject matter is not limited in this respect.

According to particular embodiments described herein, financial transactions may be completed by transmitting information over data networks using any one of several communication protocols such as, for example, the Internet protocol and related communication protocols. For convenience, references to the Internet are used herein, but embodiments are equally applicable to any type of data network, and claimed subject matter is not limited in this respect. According to particular embodiments, although claimed subject matter is not limited in this respect, a transaction between a customer and merchant may be completed without transmission of a customer's sensitive information, such as credit card information and/or other personal financial information, over the Internet. Accordingly, such sensitive information need not leave the possession of the customer to complete the transaction. Also, embodiments described herein may be suitable for use in any country and with any currency, since embodiments of the system allow financial institutions to effectuate currency exchange based on any existing exchange rates.

According to an embodiment, participants in a financial transaction system may comprise a seller, customer and a comptroller. In a particular example, a comptroller may selectively enable a transaction for the purchase of goods and/or services to complete, or terminate such a transaction based, at least in part, on conditions and/or events. While the following discussion illustrates interactions involving seller who is a merchant, this is merely an example of a seller provided for illustration of a particular embodiment of a financial transaction system. Other financial transaction systems may facilitate interactions involving a seller that is not a merchant and claimed subject matter is not limited in this respect.

In particular embodiments described herein, a credit account may be maintained on behalf of an entity for the purchase of goods and/or services on behalf of the entity by multiple customers. For example, non-cash transactions for the purchase of goods and/or services by multiple customers and/or individuals acting on behalf of the entity may be paid via a single credit account established and/or maintained on behalf of the entity. In one particular example, such a single credit account may established by a business enterprise enabling multiple employees acting as customers to make purchases on behalf of the business enterprise. In another example, such a single credit account may be established by a family enabling multiple family members acting as customers to make purchases on behalf of the family. However, these are merely examples of how a credit account may be established on behalf of an entity for the purchase of goods and/or services by multiple customers and claimed subject matter is not limited in this respect.

According to an embodiment, a financial intermediary may provide credit to an entity for the purchase of goods and/or services from a merchant. For example, such a financial intermediary may comprise a credit card company, a bank, a credit union, or other financial institution capable of facilitating non-cash transactions. Such credit provided to an entity can be derived from any type of account, such as a credit card account, debit card account, a bank account, savings account, checking account or brokerage account. However, these are merely examples of how credit may be provided to an entity using particular types of accounts and claimed subject matter is not limited in these respects. Therefore, virtually any type of financial institution and/or financial intermediary can provide credit to such an entity based on any type of account without deviating from claimed subject matter.

FIG. 1 is a schematic diagram of a financial transaction system 200 according to an embodiment. In a particular embodiment, although claimed subject matter is not limited in this respect, a comptroller 202, merchant 206 and customer 204 may operate and/or control computing platforms that are capable of communicating with one another over a communication network using any one of several data communication protocols such as the Internet Protocol (IP), for example. Accordingly, as referred to herein, the term "message" may relate to the transmission of information from a source to a destination using any one of several mediums such as, for example, a communication network such as the Internet and other IP infrastructure (e.g., email, HTTP, XML, etc.), dialup connection, facsimile transmission, person-to-person phone conversation, just to name a few.

According to an embodiment, customer 204 and comptroller 202 may be associated with an organization and/or enterprise that purchases goods and/or services from merchants according to a purchasing policy that is to be controlled, at least in part, by comptroller 202. On behalf of such an organization and/or enterprise, customer 204 may select a good and/or service available for purchase from merchant 206 in a non-cash transaction. To complete such a transaction, according to a particular embodiment, comptroller 202 may, through a message 232, request financial intermediary 203 to provide a payment notification in message 218 to merchant 206 if such a purchase complies with a purchasing policy, for example. In other embodiments, comptroller 202 may determine whether to transmit payment notification based upon other information such as, for example, information which is indicative of dynamic conditions and/or events.

According to an embodiment, although claimed subject matter is not limited in these respects, any of comptroller 202, customer 204 or merchant 206 may be associated with one or more computing platforms for use in processing transactions initiated by customer 204 as described herein. As such, it should be understood that actions described herein as being performed by comptroller 202, customer 204 and/or merchant 206 may be performed by an associated computing platform controlled and/or operated by comptroller 202, customer 204 or merchant 206. Accordingly, financial transaction system 200 may comprise installation of software installed on computing platforms controlled and/or operated by comptroller 202, customer 204 or merchant 206. Also, it should be understood that references to a "customer's computing platform," "computing platform operated by customer" and/or the like may refer to a computing platform being operated by an individual and/or customer among multiple individuals and/or customers capable of initiating non-cash transactions using a credit account established on behalf of an entity. Similarly, references to "controller's computing platform, "computing platform operated by controller" and/or the like may refer to a computing platform being operated to carry out one or more duties of a comptroller on behalf of an entity. Also, references to "merchant's computing platform, "computing platform operated by merchant" and/or the like may refer to a computing platform being operated by and/or on behalf of a merchant to enable processing of transactions for the sale of goods and/or services.

In one particular embodiment, although claimed subject matter is not limited in this respect, customer 204 and comptroller 202 may be associated with an entity that purchases goods and/or services from merchants such as merchant 206, for example. Customer 204 may initiate a transaction for the purchase of a good and/or service from merchant 206 while comptroller 202 may selectively terminate such a transaction or allow such a transaction to complete based, at least in part, on conditions and/or events.

According to an embodiment, software installed on customer 204's computing platform may contain, for example, code and/or information that can be recognized by a merchant's website that allows a purchase using financial transaction system 200. Such software may contain a changeable user password, a customer ID, a "Sales Log" database, dialing software, instructions, off-line catalog sites, and any miscellaneous promotions and/or data. Executing such software, the computing platform may then contact comptroller 202 by, for example, through a network connection using any one of several IP based protocols. Following such contact of comptroller 202, a registration process may be conducted. Here, according to a particular embodiment, comptroller 202 may check a customer ID and password provided by customer 204's computing platform against records. At registration, a different password may be chosen.

In an alternative embodiment, software installed to customer 204's computing platform may be part of a software build that is preinstalled on customer 204's computing platform as part of a uniform software build provided by an enterprise and/or organization. Here, information to authenticate customer 204's computing platform for communication with comptroller 202 to initiate non-cash transactions as described herein may therefore be included in such a preinstalled software build.

According to an embodiment, software installed on merchant 206's computing platform may be adapted to recognize consumers browsing a website using software installed on the consumers' computing platform. Such software installed on merchant 206's computing platform may maintain a database enabling processing of non-Internet orders from consumers using off-line catalogs. Also, such software installed on merchant 206's computing platform may also store a unique identifier (ID) associated with merchant 206. It should be understood, however, that these are merely examples of software that may be installed on a merchant's computing platform, and claimed subject matter is not limited in these respects.

As illustrated above, an entity may be associated with multiple individuals that may act as customers to purchase goods and/or services on behalf of the entity. According to a particular embodiment, although claimed subject matter is not limited in this respect, a single credit account may be established to facilitate payment for non-cash transactions for goods and/or services on behalf of an entity by multiple individuals and/or customers. In one example, such a credit account may be associated with a single account number. In another example, an entity may establish a single credit account having multiple account numbers to be used by associated multiple customers in purchasing goods and/or services on behalf of the entity.

In one particular embodiment, although claimed subject matter is not limited in this respect, an entity may authorize multiple customers to initiate non-cash transactions using a credit account establish on behalf of the entity. For simplicity, FIG. 1 depicts a single customer 204 capable of initiating transactions to purchase a good and/or service from a merchant. However, it should be understood that financial transaction system 200 may facilitate transactions initiated by multiple customers such as customer 204 and that following descriptions of customer 204 may apply to any of such additional customers. Also, it should be understood that such multiple customers may be authorized to initiate non-cash transactions to be funded by a single credit account or multiple credit accounts established on behalf of a single entity.

For simplicity, FIG. 1 also depicts a single merchant 206 capable of providing goods and/or service as part of transaction initiated by a customer such as customer 204. However, it should be understood that financial transaction system 200 may facilitate transactions to purchase goods and/or services from multiple merchants such as merchant 206, and that following descriptions of merchant 206 may apply to any of such additional merchants.

A customer 204 may be associated with an Order Verification Reply Target (OVRT) comprising information enabling comptroller 202 and/or financial intermediary 203 to address messages to customer 204. Such messages may comprise, for example, order confirmations or other information. Such an OVRT may comprise, for example, a telephone number to receive voice and/or facsimile communications, an e-mail address, Universal Resource Locator (URL), domain name and/or the like to which real-time communications may be addressed. It should be understood, however, that these are merely examples of information that may be used for addressing messages to a customer regarding a transaction and claimed subject matter is not limited in these respects.

According to an embodiment, non-cash transactions initiated by customer 204 may be financed through financial intermediary 203 which maintains a credit account on behalf of an entity. Financial intermediary 203 may comprise, for example, a bank, credit card company and/or the like. Once approved by comptroller 202, a request to pay (RTP) from customer 204 as part of a non-cash transaction may be forwarded to financial intermediary 203 for approval. Upon approval of such a request to pay, financial intermediary 203 may allow such a non-cash transaction to complete by providing a payment notification to merchant 206. Additional information describing how such a financial intermediary may provide a payment notification to allow a transaction to complete may be found in the aforementioned U.S. Pat. No. 6,332,134.

Merchant 206 may register with comptroller 202 and/or financial intermediary 203 to become authorized to accept payment for providing goods and/or services in transactions with customer 204. In the particular embodiment illustrated in FIG. 1, for example, financial intermediary 203 and merchant 206 may agree to use Automatic Clearing House (ACH) 222 to allow bank-to-bank transmission of funds to pay for goods and/or services provided in non-cash transactions.

Thus, merchant 206's invoice may be satisfied when financial intermediary 203 transfers funds to ACH 222 and then notifies merchant 206 of the transfer. In an alternative embodiment, merchant 206 may maintain a credit account on behalf of an entity associated with comptroller 202, and without the use of a financial intermediary for financing non-cash transactions initiated by customer 204.

As illustrated above, customer 204 may provide comptroller 202 and/or financial intermediary 203 with an OVRT to enable notifying customer 204 of the status of orders and/or other information. Here, for example, a comptroller 202 and/or financial intermediary 203 may notify customer 204 of a completion or termination of a transaction, and any problems that may have arisen in the course of the transaction, by associating customer 204 with its OVRT. As discussed above, such notification may be in the form of an automated reply via email or other Internet protocol, fax and/or a voice message, for example. According to an embodiment, merchant 206 may also be associated with an OVRT to enable comptroller 202 to send information to merchant 206 relating to purchases of customer 204. However, these are merely examples of how an OVRT may be implemented and claimed subject matter is not limited in these respects.

According to an embodiment, a history of purchases made by customer 204 on behalf of an entity using financial transaction system 200 may be maintained in a database stored on a computing platform operated by customer 204 and/or comptroller 202. Also, comptroller 202 may maintain information regarding purchases made by multiple customers on behalf of the entity using financial transaction system 200. This may enable customer 204 and/or comptroller 202 to maintain information about goods and/or services that customer 204 has purchased (e.g., vender, price, etc.) Also, the data may be maintained in a format (e.g., data fields separated by tab or comma) that may be exportable to record keeping software such as Quicken, Excel, FileMaker Pro or any program that accepts data in such a format.

According to an embodiment, comptroller 202 may be implemented in an enterprise having one or more live human managers empowered to make purchasing policy decisions affecting whether comptroller 202 will allow transactions to complete. Here, comptroller 202 may report transaction data to a live human manager in real-time (e.g., on a computer display), enabling such a human manager to view transaction data even before transactions are allowed to complete. Such real-time information allows the manager to affecting purchasing policy based on transactional data received earlier than may be otherwise available with statements from creditors available thirty days after such transactions may complete, for example.

Also, a computing platform operated by comptroller 202 may interact with back-end enterprise computing resources such as accounting programs (e.g., provided by third party vendors) to provide real-time transaction information. By integrating such real-time transaction data with enterprise computing resources, an enterprise may enjoy reduced costs in maintaining financial information as well as improved accuracy of such financial information.

According to a particular embodiment, although claimed subject matter is not limited in these respects, software installed on customer 204's computing platform may operate in conjunction with well known browser programs to allow browsing the Internet and make purchases using financial transaction system 200. Such installed software may include one or more of the following modules and/or items of information:

plugins covering typical operating systems and browsers;

routine for maintaining database logging purchases for customer 204's use;

IP address, URL and/or domain name for use in contacting comptroller 202 for registration;

offline website/catalogs featuring representative and/or preferred merchants; and applications to register with shipping companies.

The description below illustrates interactions between a computing platform controlled and/or operated by customer 204 and a computing platform controlled and/or operated by merchant 206. In one particular embodiment, although claimed subject matter is not limited in this respect, customer 204 may provide inputs via a graphical user interface (GUI) on a computing platform which are received at a website operated and/or controlled by merchant 206 according to an HTTP protocol. Alternatively, however, computing platforms operated and/or controlled by a merchant and a customer may employ any one of several techniques to communicate such as, for example, dial-up modem-to-modem communication over phone lines, a Web service, email and/or other protocols supported by the Internet protocol. It should be understood, however, that these are merely examples, of how a customer's computing platform may communicate with a merchant's computing platform, and that claimed subject matter is not limited in this respect.

In particular examples, although claimed subject matter is not limited in these respects, a Web service as indicated above may employ standard communication protocols to transmit data objects among component applications over an Internet protocol such as, for example, HTTP, HTTPS, XML, SOAP, WSDL and/or UDDI standards. Here, XML may be used to tag data objects, SOAP may be used to transfer data objects, WSDL may be used to describe available services and UDDI may be used to list available services. However, these are merely examples of protocols that may enable a Web service for communication among a merchant, customer and/or comptroller, and claimed subject matter is not limited in these respects.

As illustrated above according to particular embodiments, a plurality of customers may initiate non-cash transactions with merchant 206 for the purchase of goods and/or services under a credit account established on behalf of an entity. As illustrated below according to particular embodiments, comptroller 202 may receive information indicative of conditions and/or events from one or more sources. Such information indicative of conditions and/or events may comprise a transaction history 224 including information descriptive of past transactions between customer 204 and merchants 206, a purchasing policy 226 including any real-time updates to a purchasing policy and/or other events 228, for example. As illustrated below according to particular embodiments, comptroller 202 may selectively terminate a transaction between a merchant and customer 204, acting on behalf of an entity, based, at least in part, on such information indicative of conditions and/or events.

Figure 2:
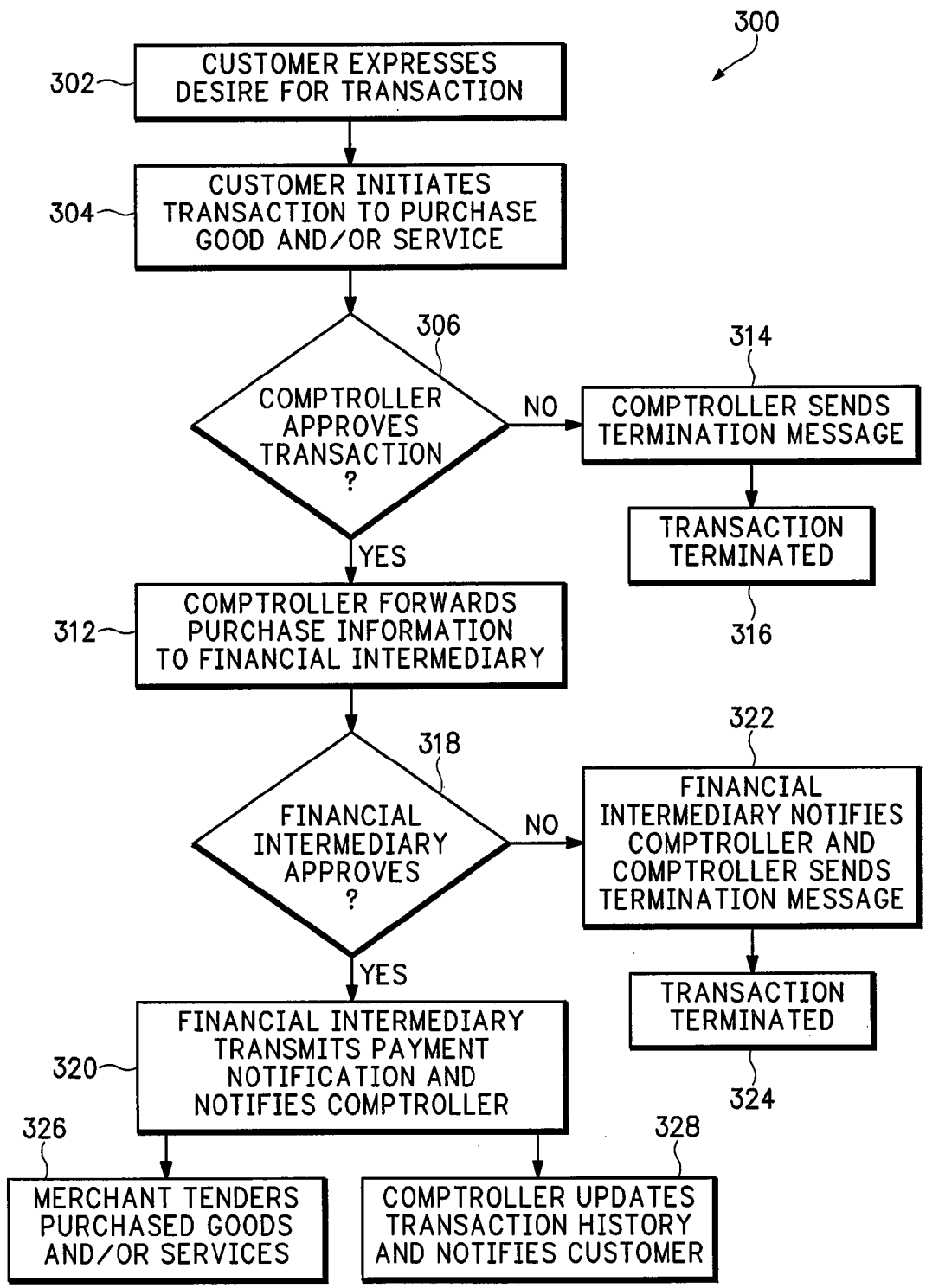
FIG. 2 is a flow diagram illustrating a process for handling non-cash transactions between a merchant and a customer according to an embodiment.

FIG. 2 is a flow diagram illustrating a process 300 for executing transactions according to an embodiment of financial transaction system 200. At block 302, customer 204 may express an interest in purchasing a good and/or service from merchant 206 by, for example, browsing a website operated by merchant 206, locating a desired good and/or service in an on-line or offline catalog and/or the like. In a particular embodiment in which customer 204 browses a website operated by merchant 206, this may be represented by message 208 transmitted by a browser installed on customer 204's computing platform. At block 304, customer 204 may then initiate a transaction by selecting a good and/or service for purchase by, for example, making a "buy" indication through a GUI on customer 204's computing platform and transmitting message 210 to reserve (or otherwise place on hold) the selected good and/or service.

Upon receipt of a selection to purchase a good and/or service from customer 204, via message 210 as illustrated above for example, merchant 206 may formulate a purchase order setting forth terms for purchase of the selected good and/or service. Such a purchase order may comprise, for example, information identifying merchant 206 (e.g., a unique identifier in financial transaction system 200 associated with merchant 206), the item(s) selected in the transaction, price, method of delivery and/or other information descriptive of a proposed transaction for the purchase of a good and/or service. In essence, though not necessarily in all embodiments, such a purchase order may act as merchant 206's offer to sell the selected items to customer 204.

As shown in FIG. 1 according to a particular embodiment, a purchase order formulated by merchant 206 may be transmitted to customer 204 as message 212, which may then be transmitted by customer 204 to comptroller 202 as a request to purchase (RTP) message 214 for further processing. Such an RTP message 214 may include, for example, purchase order data from merchant 206 and, a unique ID, password and/or OVRT associated with customer 204.

In alternative embodiment, merchant 206 may forward such a purchase order in a message (not shown) transmitted from merchant 206 directly to comptroller 202. Upon receipt of a purchase order for the purchase of a good and/or service selected by customer 204, at diamond 306 comptroller 202 may selectively approve the transaction, thus allowing the transaction to complete or terminate the transaction based, at least in part, on information indicative of conditions and/or events. If comptroller 202 does not approve the non-cash transaction, as illustrated below according to particular examples, comptroller 202 may transmit a termination message to customer 204 indicating the transaction is not approved, and the non-cash transaction terminates at block 316. Alternatively, as illustrated below, comptroller 203 may also provide to customer 204 a message indicating other options for the customer to pursue (e.g., substitute product/service, different merchant or different delivery terms).

According to an embodiment, a non-cash transaction may be allowed and/or enabled to complete by transmission of a payment notification message to a merchant. In one particular embodiment, although claimed subject matter is not limited in this respect, a merchant may establish a credit account on behalf of an organization and/or enterprise for financing non-cash transactions which are authorized by a comptroller of the organization and/or enterprise. Here, upon approval of a non-cash transaction initiated by a customer, such a comptroller may forward a payment notification directly to a merchant for transactions to be charged against the credit account maintained by a merchant. Alternatively, and as illustrated in FIGS. 1 and 2, a financial intermediary such as financial intermediary 203 may establish a credit account on behalf of an organization and/or enterprise to finance such non-cash transactions.

If comptroller 202 approves a transaction at diamond 306, according to a particular embodiment, at block 312 comptroller 202 may forward an RTP message (received from customer 204) to financial intermediary 203 in message 232. Here, financial intermediary 203 may determine whether the non-cash transaction will be allowed to complete based on, for example, whether merchant 206 is an approved merchant and/or whether there is sufficient credit established on behalf of customer 204 (or entity for which customer 204 is acting on behalf). However, these are merely examples of criteria that may be used by a financial intermediary in determining whether a non-cash transaction should be allowed to complete and claimed subject matter is not limited in these respects.

If financial intermediary 203 does not approve a non-cash transaction at diamond 318, financial intermediary 203 may provide a termination message to comptroller 202 and/or customer 204 at block 322, and the transaction may terminate at block 324. If financial intermediary 203 determines that the transaction should be allowed to complete, at block 320 financial intermediary 203 may transmit a payment notification to merchant 206 through message 218, and notify comptroller 202 through message 234 that the non-cash transaction is to be financed and allowed to complete. Such a payment notification may comprise, among other things, information expressing an intent and/or promise to make payment in exchange for a good and/or service. At block 328, comptroller 203 may then update transaction history 224 and notify customer 204 through message 230.

As pointed out above, comptroller 202 may maintain a database including information describing transaction that have completed or terminated, for example. Such information describing transactions may comprise, for example, particular goods and/or services being purchased by customer 204, the merchant selected, price information and delivery terms, just to name a few examples. In one particular embodiment, such a transaction history may comprise a job number to associate a particular purchase with a service being performed by an employee of an entity, which is to be later billed to a third party recipient of the service. In another particular embodiment, such a transaction history may comprise information relating to a location to be compared against a travel schedule for an employee, to flag potential employee theft. In yet another embodiment, such a transaction history may comprise a stock keeping unit (SKU) to determine whether more than one employee is buying the same item, for the same activity or project by mistake. Also, such an SKU may be associated with information indicating whether the part is available under some warranty. Also, the SKU could be tied to a repair manual to alert the customer that for example that a particular shaft can not be replaced without replacing its bearing.

At block 326, and upon receipt of a payment notification from financial intermediary 203, merchant 206 may tender goods and/or services to customer under terms specified in a purchase order provided in message 212. Here, merchant 206 may match order information contained in a received payment notification of message 218 with order information contained in a database maintained by merchant 206. Here, for example, merchant 206 may confirm that a received payment notification matches a particular selection provided by customer 204 via message 210 and/or a particular purchase order provided by merchant 206 via message 212. If the information matches, merchant 206 may provide the requested goods and/or services by, for example, shipping goods to and/or providing services at a specified address. In an alternative embodiment, the merchant may not have access to address information associated with a destination of a customer's purchased goods. Here, a shipping party (not shown) may merely receive goods from the merchant with order information. The shipping party may then associated the order information with location to deliver the purchased goods.

If a transaction is approved or allowed to complete at diamond 306, according to a particular embodiment, comptroller 202 may reply to the predetermined OVRT addresses associated with merchant 206 and/or customer 204 with an appropriate message. A message 216 to customer 204 may comprise an order confirmation number or other indication that the order is to be approved by comptroller 202. A payment notification message 218 to merchant 206 may include a unique order number and a pre-registered shipping address or an authorized alternate shipping address. Financial intermediary 203 may also notify merchant 206 that payment has been for transfer funds to merchant 206 through ACH 222.

If comptroller 202 does not approve a transaction to purchase a good and/or service at diamond 306, according to a particular embodiment, comptroller 202 may transmit termination messages to customer 204 and merchant 206 indicating that the requested transaction cannot be completed. Such termination messages may be transmitted to OVRT addresses associated respectively with customer 204 and merchant 206. Such a termination message to customer 204 may include, for example, an explanation as to why the transaction could not be completed such as, for example, a budget for the particular item has been or would be exceeded, insufficient authority to purchase the selected item, unapproved merchant, just to name a few. In a particular embodiment, such a termination message may indicate, for example, that another employee in the same workgroup already purchased the good and/or service selected for purchase. In yet another particular example, such a termination message may instruct customer to telephone a manager or official for more information. In one particular embodiment, although claimed subject matter is not limited in this respect, a termination message transmitted to customer 204 may also provide alternative goods and/or services to the goods and/or services originally requested, and/or an alternative merchant. However, this is merely an example of additional information that may be provided in a termination message and claimed subject matter is not limited in this respect.

According to an embodiment, comptroller 202 may determine whether to approve a transaction at diamond 306 based, at least in part, on a predetermined purchasing policy and/or information indicative of conditions and/or events from one or more sources. Regarding such a predetermined purchasing policy according to a particular embodiment, comptroller 202 may define "privilege levels" for customers and/or individuals indicating authority given to such customers and/or individuals to make purchasing decisions on behalf of an entity as illustrated in copending U.S. patent application Ser. No. 11/554,865 which is assigned to the assignee of claimed subject matter. It should be understood, however that this is merely an example of how a purchasing policy may be implemented and claimed subject matter is not limited in this respect.

In a particular example, as shown in FIG. 1, comptroller 202 may receive information regarding transaction history 224 (e.g., including information regarding transactions processed by controller 202), a purchasing policy 224 (e.g., a purchasing policy established by an entity to govern purchases made on behalf of the entity) and events 228.

As indicated above according to a particular embodiment, at block 306 comptroller 202 may selectively allow or terminate non-cash transactions to be financed by a credit account established on behalf of an entity, such as a business entity for example. Here, such an entity may establish budgets for expenses such as capital expenses and/or operational expenses. According to an embodiment, although claimed subject matter is not limited in this respect, comptroller 202 may selectively allow a transaction to complete or terminate a transaction based, at based on changes a state of a budget. For example, if an entity has already exceeded a budget or would exceed a budget if a transaction was allowed to complete, comptroller 202 may terminate the transaction at diamond 306. In another example, a good and/or service selected for purchase at block 304 is associated with a particular budget item (e.g., utilities, office supplies, employee morale, etc.). Here, comptroller 202 may selectively terminate the transaction at diamond 306 if such a particular budget item has already exceeded or would exceed if such a transaction were allowed to be completed.

According to a particular embodiment, comptroller 202 may respond to cash flow events affecting liquidity of an entity such as an enterprise. Such events affecting liquidity may include, for example, a default on an obligation payable to the entity, discovery of a liability and/or obligation payable by the entity or payment to an entity for funds owed, just to name a few. In response to such an event indicating a reduction in cash and/or an ability to pay, comptroller 202 may selectively deny and/or terminate future purchase transactions at diamond 306 if it is determined that, for example, the entity cannot fund the purchase transaction or that scarce financial resources are to be maintained in reserve for other uses (e.g., to cover payroll obligations). In response to another event indicating an increase in cash and/or an ability to pay, comptroller 202 may selectively approve future transactions at diamond 306 that may have been terminated in the absence of such an event. It should be understood, however, that these are merely examples of how a comptroller may respond to cash flow events and claimed subject matter is not limited in these respects.

An entity such as an enterprise may implement resource requirements planning in determining whether to obtain a resource based upon an availability of one or more other complementary resources. In a particular example, provided for the purpose of illustration, a winery may obtain bottles and corks as complementary resources to be used in the production of bottled wine where one bottle and one cork are used to produce a single bottle of wine. In another example, a process for manufacturing a good may comprise integrating a part (e.g., a first resource) with a product that is in an intermediate stage of production (e.g., a second resource). According to an embodiment, comptroller 202 may selectively approve a transaction to purchase a good and/or service at diamond 306 based, at least in part, on an availability of a complementary resource. Referring to a previous example, comptroller 202 may not approve a purchase of corks on behalf of a winery if the winery already possesses sufficient corks to be used in sealing bottles that the winery has in inventory. Similarly, in the manufacturing process example, comptroller 202 may not approve a purchase of a part to be integrated with a product that is in an intermediate stage of production if such a product is not available to be integrated with the part. It should be understood that these are merely examples of how a comptroller may selectively terminate a transaction to purchase a good and/or service based, at least in part, on a resource requirements scheme, and claimed subject matter is not limited in this respect.

According to an embodiment, although claimed subject matter is not limited in this respect, comptroller 202 may determine whether to terminate a transaction at block 306 or allow such a transaction to complete based, at least in part, on events and/or conditions concerning specific merchants. In one example, comptroller 202 may receive information indicative of a condition and/or event suggestive of risks associated with merchants. Such conditions and/or events may suggest, for example, that there is a substantial risk that a merchant is not capable of delivering goods and/or services which are the subject of a transaction initiated by customer 204. Accordingly, at diamond 306 comptroller 202 may selectively terminate a transaction to purchase goods and/or services from such a merchant associated with such a substantial risk of not being able to deliver the goods and/or services that are the subject of the transaction.

In another embodiment, comptroller 202 may receive information indicating that certain merchants are currently offering special deals and/or bargains (e.g., for a limited time) on the purchase of certain goods and/or services. At diamond 306, for example, comptroller 202 may selectively a terminate transaction initiated by customer 204 for the purchase of the certain goods and/or services directed to merchants that are not offering special deals and/or bargains. Upon terminating such a transaction, in one particular embodiment, comptroller 202 may transmit a termination message back to customer 204 identifying other merchants offering better pricing on the certain goods and/or services.

Figure 3:
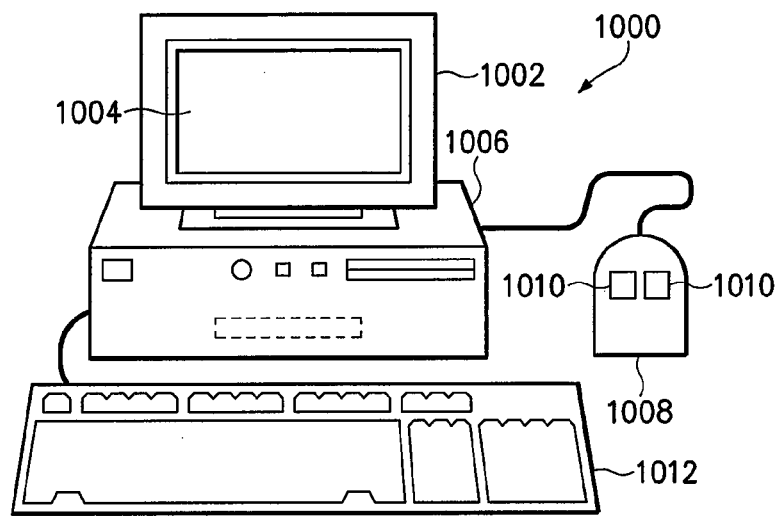
FIG. 3 is a schematic diagram of a computing platform according to an embodiment.

FIG. 3 is a schematic diagram of a computing platform 1000 suitable for use in embodiments of the financial transaction system. For example, such a computing platform may be operated by a customer, seller and/or financial intermediary to facilitate transactions as illustrated above. Here, computing platform 1000 may include display 1002 having display screen 1004, cabinet 1006 to house computer components (not shown) such as a disk drive, CDROM drive, display adapter, network card, random access memory (RAM), central processing unit (CPU), and other components, subsystems and devices, to name a few. User input devices such as a mouse 1008 having buttons 1010, and a keyboard 1012 are shown. Other user input devices such as a trackball, touch-screen, digitizing tablet, however, can be used. It should be understood that computing platform 1000 is merely illustrative of one particular type of computing platform, such as a desktop computer, suitable for use as illustrated above in connection with particular embodiments, and that other types of computing platforms may be used without deviating from claimed subject matter.

Figure 4:
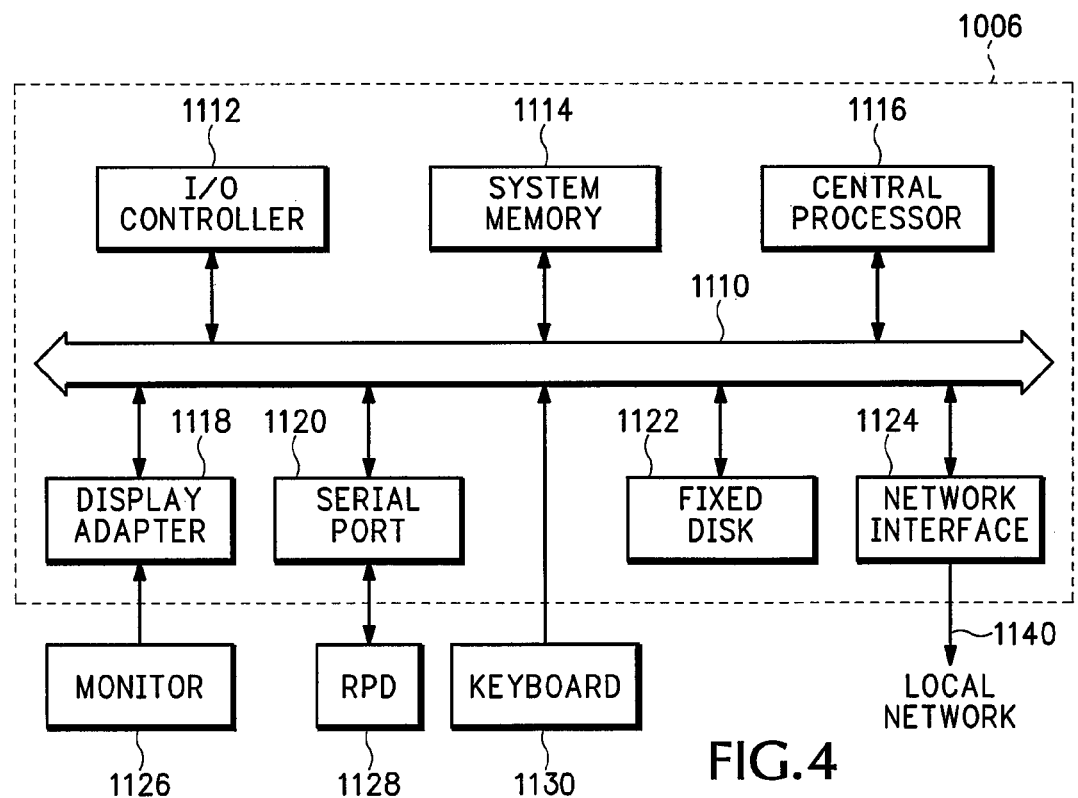
FIG. 4 is a schematic diagram of components within a computing platform according to an embodiment.

FIG. 4 is a schematic diagram of subsystems of a computing platform such as computing platform 1000 according to a particular embodiment. Subsystems within box 1006 may communicate via an internal bus 1110. Such subsystems may include input/output (I/O) controller 1112, random access memory (RAM) 1114, central processing unit (CPU) 1116, display adapter 1118, serial port 1120, fixed disk 1122 and network interface adapter 1124. Bus 1110 may allow subsystems to transfer data among the subsystems and with CPU 1116. External devices such as monitor 1126, relative pointing device (RPD) 1128 and keyboard 1130 may communicate with the CPU or other subsystems via bus 1110.

FIGS. 5A-5D show exemplary data formats which may be used during financial transactions described in the above embodiments.

FIG. 5A shows a data format 1200 for information transmitted from a merchant to a customer during operation of an embodiment of a financial transaction system as illustrated above. Data format 1200 includes a merchant ID 1202, an order number 1204, a purchase amount 1206, a transaction data 1208 and a merchant OVTR 1210. Other information in connection with a financial transaction may be included, however. Data format 1200 is intended to be an exemplary list of data items that may be transmitted from a merchant to a customer during operation of a financial transaction system, and claimed subject matter is not limited in this respect.

FIG. 5B shows a data format 1220 for information transmitted from a customer to a card company during operation of embodiments of a financial transaction system as illustrated above. Data format 1220 includes a customer ID 1222 and a customer OVTR 1224. An account number 1211 associated with a particular individual and/or customer authorized to initiate non-cash transactions may comprise information indicative of a privilege level associated with the particular individual and/or customer as discussed above. Other information in connection with a financial transaction may be included, however. Data format 1220 is intended to be an exemplary list data items that may be transmitted from a customer to a card company during operation of a financial transaction system, and claimed subject matter is not limited in this respect.

FIG. 5C shows a data format 1230 for information transmitted from a card company to a merchant during operation of embodiments of a financial transaction system as illustrated above. Data format 1230 may include an order number 1204, purchase amount 1206 and transaction date 1208. Additional information such as a shipping name 1232, a shipping address 1234, a shipping state 1236, a shipping state 1238 and a shipping zip code 1240 may also be included. Other information in connection with a financial transaction may be included, however. Data format 1230 is intended to be an exemplary list of data items that may be transmitted from a card company to a merchant during operation of a financial transaction system, and claimed subject matter is not limited in these respects.

FIG. 5D shows a data format 1250 for information transmitted from a card company to a merchant during operation of embodiments of a financial transaction system as illustrated above. Data format 1250 may include an order number 1204, purchase amount 1206 and transaction date 1208. In a particular embodiment, information 1243, relating to a customer's shipping information, can be omitted so that such information given to the merchant only identifies the purchase that has been paid for. Data format 1250 may also include a shipper identifier 1241, so that the merchant is notified of a third party shipper that will handle shipping the purchase to the customer. The customer's shipping information may be given to the third party shipper and may be kept confidential from the merchant, for example. Other information relating to the financial transaction may be included, however. Data format 1250 is intended to be an exemplary list of data items that may be transmitted from a card company to a merchant during operation of a financial transaction system, and claimed subject matter is not limited in this respect.

FIG. 6 shows an exemplary purchase log 1300 that may be employed with a financial transaction system as illustrated above and stored on a customer's computing platform. Purchase log 1300 includes a transaction date 1302, a merchant (company name) 1304 and a purchase amount 1306. Purchase log 1300 may also include a merchant URL 13108 or merchant email address 1310, which can be part of the merchant's OVRT. A transaction number 1312 may also be included in purchase log 1300 to enable a customer to reference a particular transaction by transaction number 1312. Other information relating to financial transactions may be included in a purchase log, however. Purchase log 1300 is intended to be an exemplary list of data items that may be included in a purchase log and claimed subject matter is not limited in these respects. A similar purchase log may be maintained by a merchant or card company. Thus, all parties to a particular transaction may maintain log information, and thereby store a history of financial transaction information.

FIG. 7 shows an exemplary electronic shopping cart 1400 which may be displayed in conjunction with a graphical user interface (GUI) of a computing platform operated by a customer. Here, electronic shopping cart 1400 may enable a customer to enter goods for purchase from a merchant. According to particular embodiments, although claimed subject matter is not limited in these respects, electronic shopping cart 1400 may be used in both on-line and off-line operating modes. For example, when a customer is connected to a merchants web site, the merchant information, as shown at 1402, may be automatically inserted. If an off-line catalog electronic catalog from the merchant is used, the merchant information 1402 may also be automatically inserted. However, if a hardcopy of a merchant catalog is being used, the customer may manually enter merchant information 1402 into electronic shopping cart 1400.

As a selection is entered, item information, shown at 1404, may be entered into the electronic shopping cart. A total is provided at 1406. When the customer has completed making item selections, a buy button 1408, may be clicked on to start the financial transaction as provided in particular embodiments. Therefore, the electronic shopping cart 1400 can be used in both on-line and off-line applications to select item for purchase from a merchant and to activate a financial transaction in accordance with the present invention.

While there has been illustrated and described what are presently considered to be example embodiments, it will be understood by those skilled in the art that various other modifications may be made, and equivalents may be substituted, without departing from the claimed subject matter. Additionally, many modifications may be made to adapt a particular situation to the teachings of the claimed subject matter without departing from the central concept described herein. Therefore, it is intended that the claimed subject matter not be limited to the particular embodiments disclosed, but that the such claimed subject matter may also include all embodiments falling within the scope of the appended claims, and equivalents thereof.

What is claimed is:

1. A method comprising:
a computer system electronically receiving a request from a customer to select at least one good or service for purchase from a first merchant at a first price as a non-cash transaction, wherein the purchase is on behalf of an entity, and wherein the computer system includes a processor and a memory;
the computer system electronically receiving information identifying one or more current offers for the at least one good or service, wherein the one or more current offers are from one or more merchants other than the first merchant, and wherein at least one of the one or more current offers specifies a second price for the at least one good or service that is less than the first price; and
the computer system automatically terminating the non-cash transaction responsive to a purchasing policy for the entity prohibiting the non-cash transaction based at least in part on the second price for the at least one good or service being less than the first price.

2. The method of claim 1, wherein said customer is an employee of said entity.

3. The method of claim 1, wherein said terminating is also based, at least in part, on received information indicative of a budget of said entity.

4. The method of claim 1, wherein the one or more current offers are for at least one good or service in addition to the at least one good or service.

5. The method of claim 1, wherein the one or more current offers are valid for a limited time.

6. The method of claim 1, further comprising:
presenting one or more alternative transactions in response to terminating said non-cash transaction, wherein the one or more alternative transactions are based on the one or more current offers.

7. The method of claim 1, further comprising:
the computer system receiving contact information from one or more entities;
the computer system contacting at least one of the one or more entities regarding a status of the non-cash transaction.

8. The method of claim 1, further comprising:
the computer system electronically receiving a message from the customer, wherein the message includes information regarding the non-cash transaction between the customer and the first merchant, wherein the message is generated based on information regarding the non-cash transaction that is sent from the first merchant to the customer.

9. The method of claim 8, wherein the received information includes information regarding one or more risks associated with the first merchant.

10. The method of claim 1, further comprising:
receiving a message directly from the first merchant, wherein the message includes information regarding the non-cash transaction between the customer and the first merchant.

11. The method of claim 1, wherein the received information further includes information regarding one or more risks associated with the first merchant.

12. The method of claim 1, wherein the received information includes information indicating special deals or bargains from the one or more merchants.

13. The method of claim 1, wherein the received information identifying one or more current offers includes pricing information for one or more alternative transactions to the non-cash transaction, wherein the one or more alternative transactions are based on the one or more current offers.

14. A computer system including a processor and a memory, wherein said processor is configured to execute instructions stored in said memory to cause said computer system to:
electronically receive a request from a customer to select at least one good or service for purchase from a first merchant at a first price as a non-cash transaction, wherein the purchase is on behalf of an entity;
electronically receive information specifying one or more current offers for the at least one good or service, wherein the one or more current offers are from one or more merchants other than the first merchant, and wherein at least one of the one or more current offers specifies a second price for the at least one good or service that is less than the first price; and
automatically terminate the non-cash transaction based, at least in part, on a purchasing policy for the entity prohibiting the non-cash transaction based on the second price for the at least one good or service being less than the first price.

15. The computer system of claim 14, wherein said instructions are further executable by said processor to cause said computer system configured to automatically determine whether to allow the non-cash transaction to proceed based, at least in part, on received information indicative of a budget of said entity.

16. The computer system of claim 14, wherein said instructions are further executable by said processor to cause said computer system to automatically determine whether to allow the non-cash transaction to proceed based, at least in part, on received information indicative of a cash flow event affecting said entity.

17. The computer system of claim 14, wherein said instructions are further executable by said processor to cause said computer system to automatically determine whether to allow the non-cash transaction to proceed based, at least in part, on received information indicative of a privilege level for the customer.

18. The computer system of claim 14, wherein said instructions are further executable by said processor to cause said computer system to:
present one or more alternative transactions in response to terminating said non-cash transaction, wherein the one or more alternative transactions are based on the one or more current offers.

19. The computer system of claim 18, wherein the received information specifying one or more current offers includes pricing information for one or more alternative transactions to the non-cash transaction, wherein the one or more alternative transactions are based on the one or more current offers.

20. The computer system of claim 14, wherein the instructions are further executable by said processor to cause said computer system to electronically receive a message from the customer, wherein the message includes information regarding the non-cash transaction, wherein the message is generated based on information regarding the non-cash transaction that is sent between the first merchant and the customer.

21. The computer system of claim 14, wherein the instructions are further executable by said processor to cause said computer system to electronically receive a message directly from the first merchant, wherein the message includes information regarding the non-cash transaction.

22. The computer system of claim 14, wherein the received information further includes information regarding one or more risks associated with the first merchant.

23. The computer system of claim 14, wherein the received information includes information indicating a special deal or a bargain, wherein the special deal or bargain is from the one or more merchants other than the first merchant.

24. The computer system of claim 14, wherein the instructions are further executable by said processor to cause said computer system to forward purchase information to a financial intermediary in response to automatically determining to allow the non-cash transaction to proceed, wherein the purchase information indicates an identity of the customer.

25. The computer system of claim 14, wherein the instructions are further executable by said processor to cause said computer system, subsequent to automatically determining to allow the non-cash transaction to proceed, to transmit a payment notification to the first merchant.

26. A non-transitory computer-readable storage medium having stored thereon computer-executable instructions that are executable by a computing device including a processor and a memory to cause the computing device to perform operations comprising:
electronically receiving a request from a customer to select at least one good or service for purchase from a first merchant at a first price as a non-cash transaction, wherein the purchase is on behalf of an entity;
electronically receiving information identifying one or more current offers for the at least one good or service, wherein the one or more current offers are from one or more merchants that are not the first merchant, and wherein the one or more current offers specify a second price for the at least one good or service that is less than the first price; and
automatically terminating the non-cash transaction based, at least in part, on a purchasing policy for the entity prohibiting the non-cash transaction based on the second price for the at least one good or service being less than the first price.

27. The non-transitory computer-readable storage medium of claim 26, wherein said determining is also based, at least in part, on received information indicative of a budget of said entity.

28. The non-transitory computer-readable storage medium of claim 26, wherein the one or more current offers are valid for a limited time.

29. The non-transitory computer-readable storage medium of claim 26, wherein said determining is also based, at least in part, on received information indicative of a risk of the first merchant failing to deliver the at least one good or service.

30. The non-transitory computer-readable storage medium of claim 26, wherein said operations further comprise:
presenting one or more alternative transactions in response to terminating said non-cash transaction, wherein the one or more alternative transactions involve a merchant other than the first merchant.

31. The non-transitory computer-readable storage medium of claim 30, wherein said terminating is performed responsive to said received information identifying the one or more current offers.

32. The non-transitory computer-readable storage medium of claim 26, wherein the operations further comprise:
electronically receiving a message from the customer, wherein the message includes information regarding the non-cash transaction, and wherein the message is generated based on information regarding the non-cash transaction that is sent between the first merchant and the customer.

33. The non-transitory computer-readable storage medium of claim 26, wherein the operations further comprise:
electronically receiving a message directly from the first merchant, wherein the message includes information regarding the non-cash transaction.

34. The non-transitory computer-readable storage medium of claim 26, wherein the operations further comprise:
causing the entity to be contacted regarding a status of the non-cash transaction.

35. The non-transitory computer-readable storage medium of claim 26, wherein the received information further includes information regarding one or more risks associated with making purchases from the first merchant.

36. The non-transitory computer-readable storage medium of claim 26, wherein the received information includes information indicating a special deal from the one or more merchants that are not the first merchant.

* * * * *

UNITED STATES PATENT AND TRADEMARK OFFICE
CERTIFICATE OF CORRECTION

| | | |
|---|---|---|
| PATENT NO. | : 8,060,437 B2 | Page 1 of 1 |
| APPLICATION NO. | : 11/554880 | |
| DATED | : November 15, 2011 | |
| INVENTOR(S) | : Foster | |

It is certified that error appears in the above-identified patent and that said Letters Patent is hereby corrected as shown below:

Column 17, line 66, in Claim 4, delete "good" and insert -- other good --.

Column 18, line 64, in Claim 15, delete "system configured" and insert -- system --.

Signed and Sealed this
Twenty-ninth Day of May, 2012

David J. Kappos
*Director of the United States Patent and Trademark Office*